(12) United States Patent
Engler

(10) Patent No.: US 11,170,474 B2
(45) Date of Patent: Nov. 9, 2021

(54) SYSTEMS AND METHODS FOR PRESENTING LATENT FIGURES IN DIGITAL IMAGERY

(71) Applicant: Sheri Engler, Medford, OR (US)

(72) Inventor: Sheri Engler, Medford, OR (US)

( * ) Notice: Subject to any disclaimer, the term of this patent is extended or adjusted under 35 U.S.C. 154(b) by 0 days.

(21) Appl. No.: 16/218,655

(22) Filed: Dec. 13, 2018

(65) Prior Publication Data
US 2019/0325563 A1    Oct. 24, 2019

Related U.S. Application Data

(63) Continuation of application No. 13/948,793, filed on Jul. 23, 2013, now Pat. No. 10,192,290.

(60) Provisional application No. 61/674,621, filed on Jul. 23, 2012.

(51) Int. Cl.
| | | |
|---|---|---|
| *G06K 9/62* | (2006.01) | |
| *G06T 5/00* | (2006.01) | |
| *G06Q 50/00* | (2012.01) | |
| *G06K 9/32* | (2006.01) | |
| *G06K 9/00* | (2006.01) | |

(52) U.S. Cl.
CPC .................. *G06T 5/00* (2013.01); *G06K 9/00* (2013.01); *G06K 9/00221* (2013.01); *G06K 9/3233* (2013.01); *G06Q 50/01* (2013.01); *G06T 2207/10004* (2013.01); *G06T 2207/10024* (2013.01)

(58) Field of Classification Search
CPC ....................................... G06K 9/00228–00261
See application file for complete search history.

(56) References Cited

U.S. PATENT DOCUMENTS

| | | |
|---|---|---|
| 2003/0035917 A1 | 1/2003 | Hyman |
| 2011/0194618 A1 | 8/2011 | Gish et al. |
| 2011/0280446 A1* | 11/2011 | Steinberg ........... G06K 9/00228 382/103 |
| 2013/0163832 A1* | 6/2013 | Murakami ............. H04N 7/173 382/118 |

FOREIGN PATENT DOCUMENTS

GB          1999039322 A2    8/1999

OTHER PUBLICATIONS

Stephan K. Chalup et al., "Simulating Pareidolia of Faces for Architectural Image Analysis", International Journal of Computer Information Systems and Industrial Management Applications (IJCISIM), ISSN: 2150-7988 vol. 2 (2010), cover page + pp. 262-278. (Year: 2010).*

(Continued)

*Primary Examiner* — Brian Werner

(57) ABSTRACT

An online community offering communication, guidance, and features used to enhance photographs to reveal eyes, faces, images, religious iconery, spirits, animals and more is presented herein. Each of the revealed images is already embedded in every photograph. The present invention allows users to reveal those images. The processes for revealing hidden images involve removing different layers of the photograph to enhance what is already there and hidden, hence revealing the hidden spiritual images.

19 Claims, 17 Drawing Sheets

(2 of 17 Drawing Sheet(s) Filed in Color)

(56) References Cited

OTHER PUBLICATIONS

MessageToEagle, "12 Amazing Images of Faces in The Sky Observed Worldwide", from www.messagetoeagle.com/12-amazing-images-of-faces-in-the-sky-observed-worldwide/, published online on Apr. 14, 2012, pp. 1-10. (Year: 2012).*

Salvador Dali's painting Visage of War, 1940, provided here on a 2 page document, no author. (Year: 1940).*

* cited by examiner

SYSTEMS AND METHODS FOR PRESENTING LATENT FIGURES IN DIGITAL IMAGERY

CROSS-REFERENCES TO RELATED APPLICATIONS

This application is a continuation application of U.S. patent application Ser. No. 13/948,793, filed Jul. 23, 2013, issued as U.S. Pat. No. 10,192,290 on Jan. 29, 2019, and entitled "INTERFACE FOR REVEALING LATENT FIGURES WITHIN IMAGES", which claims priority to U.S. Provisional Patent Application Ser. No. 61/674,621 filed on Jul. 23, 2012 entitled "COMMUNITY FOR REVEALING SPIRITUAL IMAGES", the entire disclosures of which are hereby incorporated by reference.

FIELD OF THE INVENTION

The present invention generally relates to revealing spiritual images and, more particularly, to creating a community for the revealing of spiritual images hidden within photographs.

BACKGROUND OF THE INVENTION

At the present time, Spiritual Awakening is happening across all continents on this planet. Dec. 21, 2012 was the end of the Oxlajuj Baktun cycle, the end of the "long-count" calendar that finishes up a 5,129-year cycle in the Mayan calendar. The ancient Maya people were master astrologers and timekeepers, tracking the stars and planets and developing a cyclical calendar.

In the Maya cosmovisión (world view), time is cyclical. The long-count calendar culminated and planets were aligned. It is not the end of the world as some thought, but the change of cycles; a new era, a new beginning. Spiritually, the change in cycles means a renewing of energies. This changing of energies ties in with many philosophies and includes predictions from historic visionaries spiritual texts, and beliefs.

There is a "divine planetary shift" that has already begun. It has been prophesied throughout history by nearly all religious texts, as well as many ancient cultures from Egypt to Atlantis to the Hopi Indians, and by astrologers, cosmologists, Nostradamus, Edgar Cayce, and of course, the Mayan calendar.

The majority of these beliefs point to references of the "Divine Eye", a.k.a. "The Eye of Creation" or the "All-Seeing Eye of God". This symbol shows an eye often surrounded by rays of light and is sometimes enclosed by a triangle. (In ancient Egypt, the eye in the triangle is their symbol for "awakening"). It is sometimes interpreted as representing the Eye of God watching over humankind (or divine providence). In modern times, the most notable depiction of the eye is the reverse of the Great Seal of the United States, which appears on the one-dollar bill.

Imagery of an all-seeing eye can be traced back to Egyptian mythology and the Eye of Horus. It also appears in Buddhism, where Buddha is also regularly referred to as the "Eye of the World" throughout Buddhist scriptures (e.g. Mahaparinibbana Sutta). It is also used to depict the image of God in Caodaism.

In Medieval and Renaissance European iconography, the Eye (often with the addition of an enclosing triangle) was an explicit image of the Christian Trinity. Seventeenth-century depictions of the Eye of Providence sometimes show it surrounded by clouds or sunbursts.

Millions believe in the divine eye principles, energy and spiritual awakenings, as well as, psychic vision through our "third eye" chakra. Oddly enough many nebula such as the Helix and Cat's-Eye nebula closely resemble eyes. Ultimately, there are eyes all around us, and not just eyes—but faces, images and more.

This ties in with the new cycle of the Mayan Calendar, as it is the start of a new generation of consciousness, which allows mankind the ability to be able to "see" things differently or see "things" that have always been there.

BRIEF SUMMARY OF THE INVENTION

The present invention provides techniques used to enhance photographs to reveal eyes, faces, images, religious iconery, spirits, animals and more. Each of these images is already embedded in each and every picture, just waiting to be uncovered or discovered by someone.

The techniques involve revealing different layers of the photograph to enhance what is already there and hidden, hence revealing hidden images.

The preceding brief description is intended to merely outline some functions and advantages of the present invention. The following disclosure will set forth other functions and advantages of the present invention along with novel features that distinguish the present invention from the prior art. It is to be understood that the following disclosure is by no means intended to limit the scope of the present invention or any of its embodiments. It is also to be understood that the accompanying illustrations are presented for descriptive purposes only and similarly are not intended to limit the scope of present invention or any of its embodiments. The following disclosure and accompanying illustrations may describe various features of novelty that characterize the invention. The invention does not reside in any particular feature when taken in the singular, but in the combination of features as described herein.

BRIEF DESCRIPTION OF DRAWINGS

The patent or application file contains at least one drawing executed in color. Copies of this patent or patent application publication with color drawing(s) will be provided by the Office upon request and payment of the necessary fee.

Figure 1:
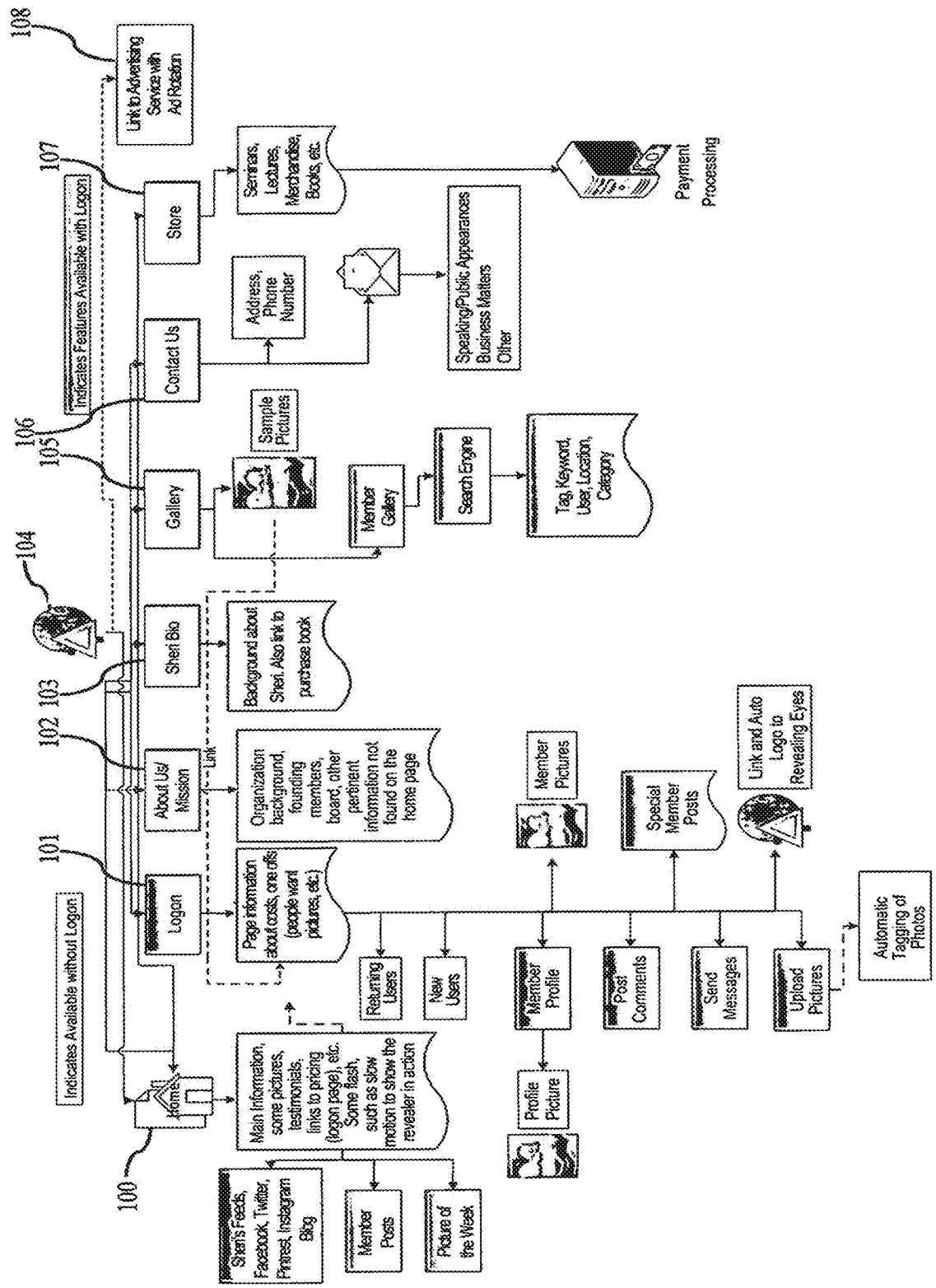
FIG. 1 is a block diagram illustrating a website workflow summary as according to one embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to the accompanying images that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by appended claims, appropriately interpreted, along with the full range of equivalents to which the claims are entitled.

In a manner described below, the data processing aspects of the present invention may be implemented, in part, by programs that are executed by a computer. The term "computer" as used herein includes any device that electronically executes one or more programs, such as personal computers (PCs), hand-held devices, multi-processor systems, microprocessor-based programmable consumer electronics, network PCs, minicomputers, mainframe computers, routers, gateways, hubs and the like. The term "program" as used herein includes applications, routines, objects, components, data structures and the like that perform particular tasks or implement particular abstract data types. The term "program" as used herein further may connote a single program application or module or multiple applications or program modules acting in concert. The data processing aspects of the invention also may be employed in distributed computing environments, where tasks are performed by remote processing devices that are linked through a communications network. In a distributed computing environment, programs may be located in both local and remote memory storage devices.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the apparatus include the discussed feature, advantage or mode of operation. The following descriptions of the preferred embodiments are merely exemplary in nature and is in no way intended to limit the invention, its application, or use.

For the purpose of clarity, all like elements mentioned in this description will have the same designations and numbering. The terms "community for revealing spiritual images", "revealing spiritual images", "process for revealing spiritual images", "invention", and "present invention" may be used interchangeably. Also, the terms "photograph", "picture" and "image" are interchangeable. These terms all refer to a still image taken by a user via a digital or film camera, or can refer to a still image captured from a video, movie, or sequence of still images.

In addition to the functions, features, components, and abilities of the website already discussed in this specification, the website may also have, but not be limited to, the following features contained within the description below.

Several preferred embodiments of the community for revealing spiritual images are discussed in this section. However, the invention is not limited to these embodiments. A community for revealing spiritual images, as according to the present invention, is any computer-enabled process that provides tools designed to reveal spiritual images within a photograph. Some embodiments of the present invention provide an Internet application containing image-editing software with the tools for revealing spiritual images within a photograph. Still other embodiments of the present invention provide one or more Internet web sites that act as points of contact for customers wishing to gain access to a revealing service for their own pictures. This embodiment creates an online community where members can post their own pictures, comment on the pictures of others, and purchase products. Yet other embodiments of the present invention offer mobile applications that can be run on smartphones, tablets, and other portable electronic devices. These applications contain the functions and features of the present invention and are intended to expand the online community to additional users.

The present invention provides computer-implemented features used to enhance photographs to reveal spiritual images within the photographs. The spiritual images are often initially hidden, but through the claimed invention can be revealed. The spiritual images are primarily faces, eyes, whole bodies, or parts thereof, religious iconery, spirits, or animals, and more. The spiritual images have a very broad range and can include nature spirits such as fairies or elves, angels, fictional animals, non-fictional animals, identifiable beings, angels, and non-identifiable beings.

The present invention was created under the hypotheses that everything is made of faces and all faces are ultimately made of eyes. Eyes revealed within an image may be made of miniscule dots, which may further constitute smaller eyes. These dots may make up the mosaic of what we think we are seeing within an image. The present invention reveals those faces and eyes in the photographs processed by the invention. The present invention seeks to permit any user to reveal the repeating faces and eyes within nearly any captured image. The revealed images may be faces, eyes, parts of eyes, figures, people, beings, religious figures, animals, creatures, and/or any parts or combinations thereof. The revealed images may also present fractal-like patterns, faces within faces, faces within eyes, and/or any combination thereof. There is a consistent formula for locating other faces or eyes once an initial face or eye is located. Larger, more readily observable faces may be geometrically organized. Beyond the normal layout of the face, there may be a consistent formula for identifying other faces and eyes. Once one eye is revealed in an image, there may be another one next to it, where it would normally be found on a face, unless there is something in front of it blocking it from view. Each located eye will be a shared eye with another whole face right next to it and so on to infinity in that way. The center "shared" eye of the two faces will match the other eye it goes with, but the outside eye of each face will not match each other. Upon examination, each eye may be a shared eye with another whole face next to it and so on to infinity in that way. The center "shared" eye (b) of the two faces may match the other eye it goes with, but the outside eye of each face (a & c) may not match each other. Thus, (a) may match (b) and (b) may match (c), but (a) may not match (c). Within each pupil of every eye, there may be a full face; and likewise in each pupil of that face there may be another face and so on to infinity. There may also be an eye under each eyebrow near the bridge of the nose. Each nostril, upon closer inspection, may be an eye creating a new face below the nose. Lips may also be one large eye which begins another face as you look to the left and right for the shared eye pattern. The eye that forms the lips may have a complete face in the pupil as they all do and so on. Faces and entities may be layered, holographic, or perhaps relative to the person identifying the latent features within the image. The revealed images may layer upward from the first image revealed. By way of example, a head may have a different head above it at about the forehead line and up again and again. All heads may have completely different faces. Alternatively, if a revealed image is a head and torso, more heads and torsos may layer upward. Nearly every aspect of this visual phenomenon may repeat ad infinitum—predictably, if not mathematically.

It should be noted that the present invention reveals images to be comprised of eyes which are fractals of the whole image and which all together comprise the Eye of God, or consciousness. The present invention reveals images to be fractals composed of eyes. Images and shapes within images have generally been given the term "fractals" derived from the Latin word fractus, the adjectival form of frangere, or "to break". Unlike conventional geometry, which deals with lines, triangles, circles, spheres and cones, fractals are concerned with broken or "fractured" shapes as so commonly found in nature. Fractals are typically patterns that appear to be the same when viewed from a wide-scale, overview perspective and when viewed from a detailed, close-scale perspective. Fractals have been used to describe repeating objects and geometrical formations. Many structures exhibit an underlying geometric regularity, known as scale invariance or self-similarity that is the tendency of natural forms to repeat themselves, as with the resemblance and shape between large branches of a tree and small twigs. If these objects are observed at different size scales, there is the same fundamental pattern that is encountered. Even though fractals exhibit the property of self-similarity, the repeating shapes do not have to be exactly identical. Traditional fractal mathematical conception and fractal art typically deals with abstract or geometric shapes. Both the mathematicians and the artists have overlooked very common natural shapes that repeats themselves when viewed from near and afar. Those shapes are faces and eyes. Faces and eyes can be seen in nearly everything around us. However, it was not until the advent of photography and accompanying photographic analysis tools that recognition of faces and eyes was possible.

Thus, with the discovery of faces and eyes that can be found within most captured images, the present invention was conceived and one of its objectives is to provide a method for revealing those faces and eyes. It is another object of the present invention to provide a method for revealing faces or eyes in a fractal-like manner within the faces or eyes already revealed in a captured image. It is yet another object of the present invention to provide a method for enhancing the clarity of faces or eyes within a captured image. The revealed faces are generally a full face, a small percentage are ¾ths view and fewer still are profile. Most have a neutral affect. Smiles are very uncommon, though sometimes present. Any negative affect is very scarce.

Referring now to FIG. 1, there is shown a block diagram illustrating a website workflow summary as according to one embodiment of the present invention. A website (104) contains: a home page (100), a logon page (101), an about us and mission statement page (102), a biography page (103), a gallery page (105), a contact us page (106), a store page (107), and a link to an advertising service that rotates ads visible on the website (108). The home page (100) is a primary portal to the community for revealing spiritual images. The home page (100) contains pictures, testimonials, and links to pricing, and animations that show the spiritual image revealing subsystem in action. The home page (100) also contains the website founder's feeds such as Facebook, Twitter, Pinterest, Instagram and blogs. Members can also post to the home page (100), and a picture of the week can be shown on the home page (100).

From the home page (100), users can logon (101) to access additional community features. If users do not have an account, the logon (101) page displays the costs for membership or picture processing fees. The features accessible to members after logging on include, but are not limited to, changing their member profile or profile picture, posting comments, sending messages, uploading their pictures, viewing other member's pictures, and viewing special member's posts.

The about us and mission statement page (102) provides users with background information about the community for revealing spiritual images. This page (102) also contains information about the founding members, the Board, and contains other pertinent information not found on the home page (100).

The biography page (103) contains background about the website founder. The website founder is the person that created the process for revealing spiritual images. The biography page (103) also contains links to purchase the website founder's book.

The gallery page (105) contains the photographs taken by members of the community for revealing spiritual images. The gallery page (105) displays sample images to users and has a member's gallery with a search engine that allows users to search for pictures by using queries such as tags, keyword, username, location, or category. The member's gallery and search engine are accessible to users after they have logged into the community.

The contact page (106) contains the contact information for the Administrators of the community for revealing spiritual images. The contact information includes addresses, phone numbers, and the ability to send emails to the Administrators. Users can send emails to the Administrators to arrange speaking or public appearances, or to discuss business or other matters.

The store page (107) allows users to purchase seminars, lectures, books, or other types of merchandise related to the community for revealing spiritual images. Users do not need to logon (101) to purchase from the store page (107). Once a user selects items to purchase, they go through a payment process to complete their purchase.

Figure 2:
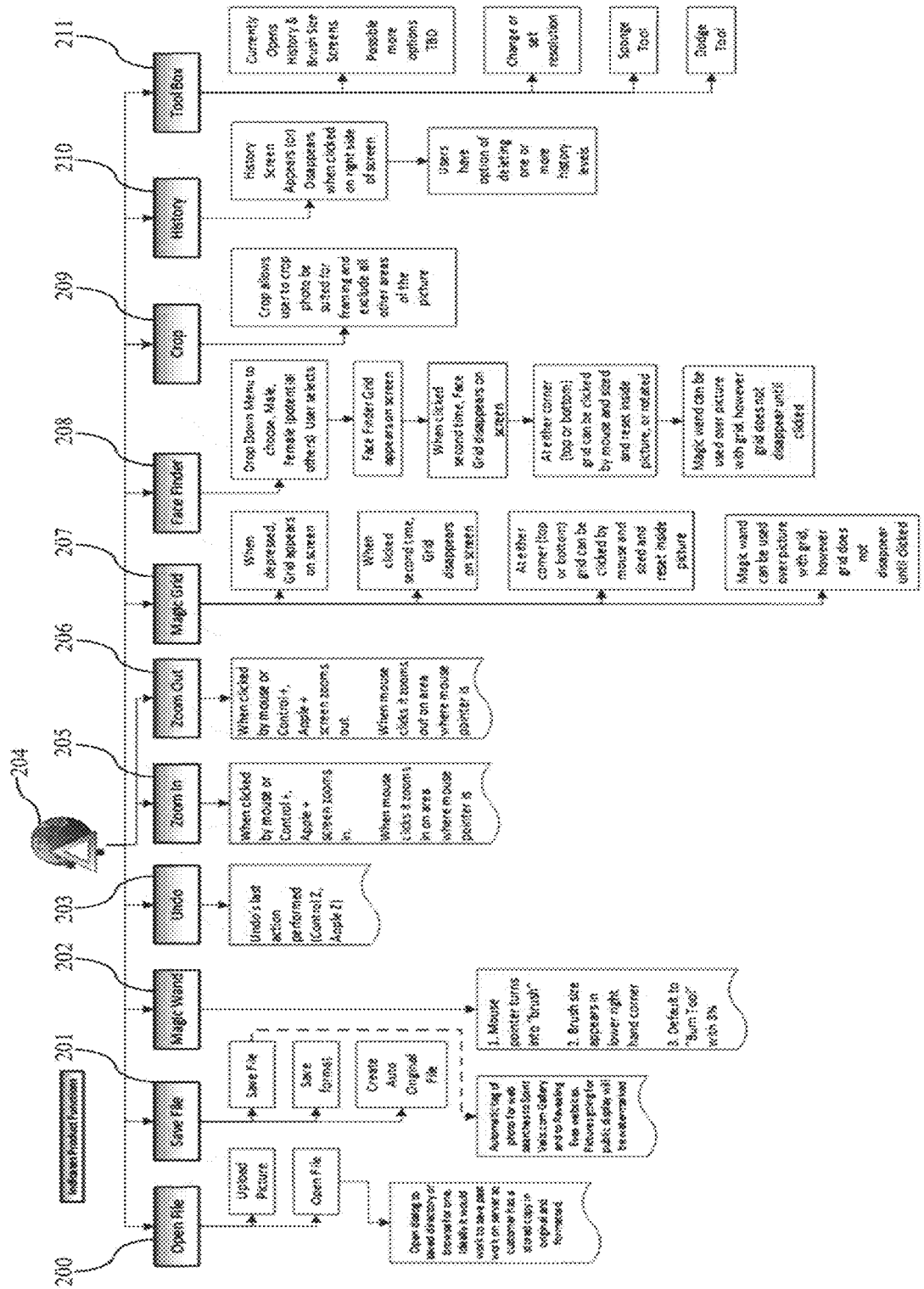
FIG. 2 is a block diagram illustrating a product functions flow as according to one embodiment of the present invention.

Referring now to FIG. 2, there is shown a block diagram illustrating a product functions flow as according to one embodiment of the present invention. A website (204) contains many product functions that allow users to reveal spiritual images. The functions include: an open file feature (200), a save file feature (201), a magic wand tool (202), an undo tool (203), a zoom in tool (205), a zoom out tool (206), a magic grid tool (207), a face finder tool (208), a crop tool (209), a history screen (210), and a tool box (211). Some embodiments of the present invention include levels or a histogram tool. The aforementioned features and tools allow a user to process their pictures to reveal spiritual images that are hidden within those pictures.

The open file (200) feature allows users to upload pictures to the website (204), or open existing pictures that have already been uploaded to the website (204). If opening a file, an open dialog will appear on the user's screen showing the contents of a saved directory. The open file (200) dialog will also allow users to browse to a different location to open their file. In one embodiment of the present invention, users save their work on the community's server so that they have easily accessible stored copies of the original picture and formatted versions of their picture.

The save file feature (201) allows users to save pictures that are in the process of having spiritual images revealed, or pictures that have completed the process. Users can save any modifications or revisions to existing work. When saving a file (201), a tag is automatically attached to the picture allowing it to be discovered during searches of the web site (204) and the gallery (FIG. 1 (105)). Pictures to be publicly displayed will also have a watermark inserted into the picture. The save file feature (201) will automatically create an original file when users save processed versions of their work.

The magic wand tool (202) allows users to burn or dodge portions of their photograph. For purposes of this disclosure, the terms burning and dodging refer to the darkroom techniques of darkening areas of a photograph and lightening areas of a photograph, respectively. When using the magic wand tool (202), the present invention allows users to burn or dodge the midtone values of their photographs. The magic wand's (202) burn and dodge settings have an exposure range from one to ninety-nine percent. The exposure range will be alterable by the user, with a default setting of three percent. When a user selects the magic wand tool (202), the mouse pointer turns into a brush thereby visually indicating that the magic wand tool (202) has been selected. The brush size is viewable in a window that appears to the user. The user can select preset brushes of different size. The default setting of the magic wand tool (202) is burn with 3% exposure and 100% edge hardness. Some embodiments of the present invention provide magic wand settings that control levels and brush hardness.

The undo feature (203) allows a user to cancel or reverse the last command executed. Thus, if a user makes a mistake or wishes to undo a photograph edit, the undo feature (203) quickly and easily allows for a reversal of their action. The undo feature (203) can be activated by pressing keyboard command keys.

The zoom in feature (205) allows users to expand the view of a particular area of their photograph. A user can zoom in (205) on their photograph through keyboard command keys or by using mouse clicks. When using mouse clicks to zoom in, the area where the mouse pointer is located will be expanded.

The zoom out feature (206) allows users to reduce the view of a particular area of their photograph. A user can zoom out (206) of their photograph through keyboard command keys or by using mouse clicks. When using mouse clicks to zoom in, the area where the mouse pointer is located will be contracted.

The magic grid tool (207) causes a grid to be overlaid on a user's photograph. The grid assists users in finding spiritual images by overlying lines that create visually distinguishable search areas within a photograph. By creating the visually distinguishable areas, users can focus their attention on particular areas thereby increasing the ease and probability of discovering spiritual images. When the magic grid tool (207) is depressed, a grid appears on the screen. When depressed a second time, the grid disappears from the screen. The magic grid (207) can be sized or reset by clicking control areas at the top or bottom corner of the grid. The magic wand tool (202) can be used in conjunction with the magic grid (207). When using the magic wand tool (202) and the magic grid tool (207) together, the magic grid tool (207) does not disappear until the magic grid (207) icon is clicked. The magic grid tool is able to change perspective for faces that are ¾ths view or profile view. By changing perspective, it is meant that the magic grid tool can be rotated in three dimensions around an x, y, or z axis, or any combination thereof, so that the grid properly overlays the ¾ths view and profile view faces.

The face finder tool (208) is a grid, roughly in the shape of a face, which allows users to easily locate faces or facial features within their photograph. The face finder tool (208) is set to a generic face by default, but a drop down menu allows users to select different face shapes. Users can select male faces, female faces, fictional character faces, angels, or non-fictional character faces. When clicked on for the first time, the face finder tool (208) creates a face-shaped grid over the user's picture. When clicked on a second time, the face finder's (208) face-shaped grid disappears from the screen. The face finder's (208) face-shaped grid (207) can be sized or reset by clicking control areas at the top or bottom corner of the grid. The face finder's (208) face-shaped grid can be used in conjunction with the magic grid (207). When using the face finder's (208) face-shaped grid and the magic grid tool (207) together, the magic grid tool (207) does not disappear until the magic grid (207) icon is clicked.

The crop tool (209) allows users to crop photographs so that the photographs are suitable for framing. All areas of the photograph not included within the portion of the crop tool to be retained are discarded.

The history screen (210) displays a list of actions performed by the user. The list of actions contains actions that the user performed while processing their photographs. Each history action can be clicked on and deleted to remove actions performed by the user. Users have the option of deleting one or more history levels in the history screen (210). Clicking on the history screen (210) icon once will cause the history screen (210) to appear. Clicking on the history screen (210) icon a second time will cause the history screen (210) to disappear.

The tool box (211) contains customizable options for other tools and features. Clicking on the tool box (211) icon will open history, brush size, hardness, resolution, and burn configuration settings, including range settings for highlights, midtones, and shadows. Not pictured, but included within the scope of the present invention, is a sponge tool, as well as a dodge or lightening tool. The sponge tool is a retouching tool used to alter the saturation of a portion of a user's picture. The sponge tool has a desaturate mode and a saturate mode. Desaturate mode removes color, whilst saturate mode intensifies the colors making them brighter. The tool box (211) will contain configuration settings for the sponge tool. Other embodiments of the present invention will cause additional configuration settings to be displayed when the tool box (211) icon is clicked on.

Figure 3:
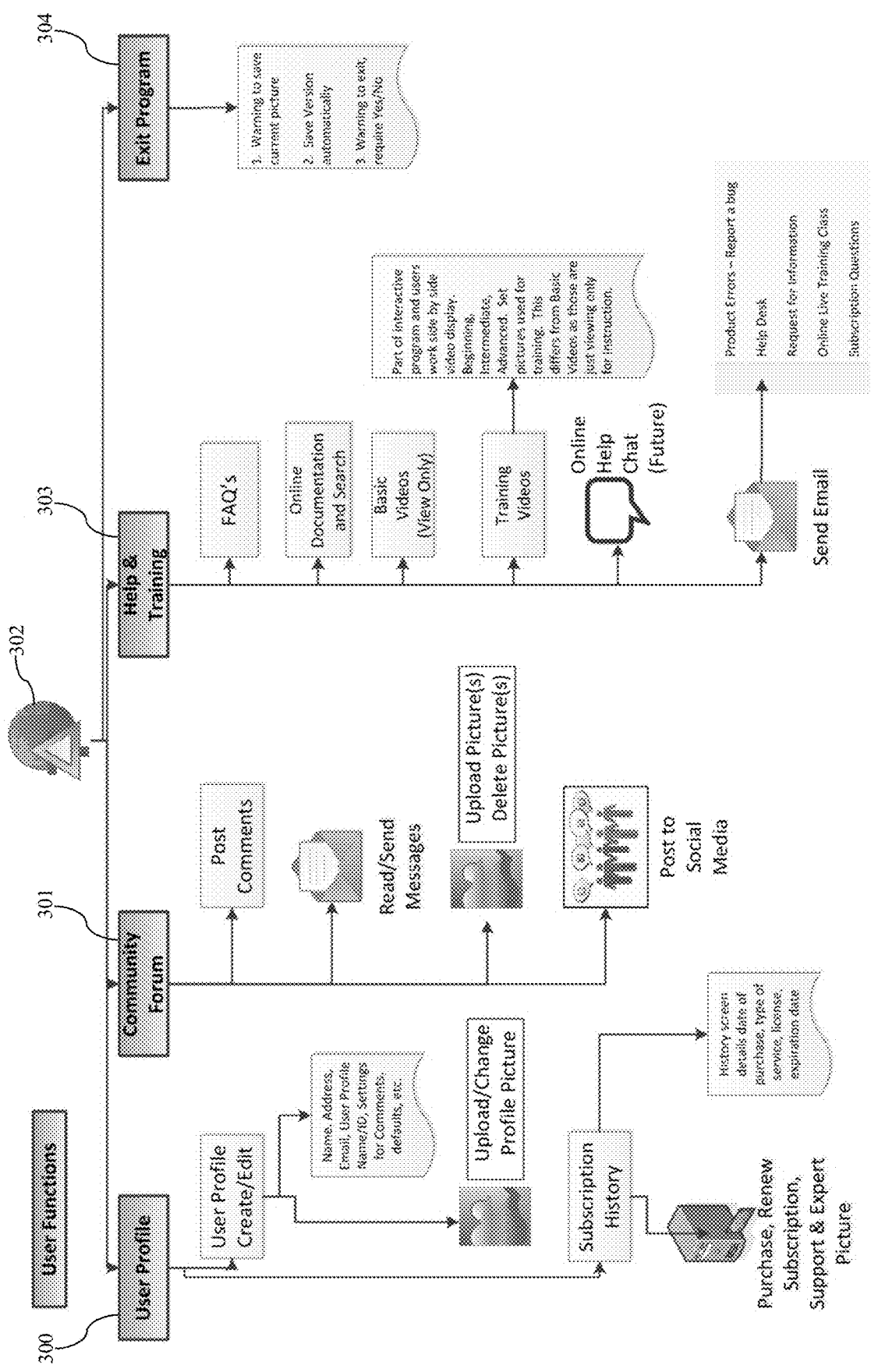
FIG. 3 is a block diagram illustrating a user functions flow as according to one embodiment of the present invention.

Referring now to FIG. 3, there is shown a block diagram illustrating a user functions flow as according to one embodiment of the present invention. A website (302) contains many user functions that allow users to reveal spiritual images. The functions include: a user profile (300), a community forum (301), help and training (303), and an exit program function (304). The aforementioned features and tools allow a user to reveal, and receive assistance in revealing, spiritual images hidden within their pictures.

The user profile (300) function allows users to create or edit their profiles. A user's profile contains personal information such as a user's name, address, email address, profile name or ID, setting for comments, and default values. The user profile (300) feature also allows users to upload or change their profile pictures. A user's subscription history is viewable through a history screen in the user profile (300) feature. The history screen provides the details of transactions with the user such as the date of purchase, type of service, license, and expiration date. From the user profile (300), a user can make purchases, renew their subscription, or obtain support and expert, super user, picture assistance.

The community forum (301) provides a means within the website (302) for users to share experiences and communicate with each other. In the community forum (301), users can post comments, read or send messages, upload or delete pictures, and post to social media sites.

The help and training feature (303) provides valuable resources for assisting users with revealing spiritual images. Users can access: Frequently Asked Questions (FAQs), online documentation and search functionalities, basic videos, training videos, online chat help. Users will be able to send emails to report product errors, contact a help desk, request information, request online live training classes, and ask subscription questions. The training videos are part of an interactive program where trainers and students work side-by-side through a video display to reveal spiritual images. This functionality is described in further detail below. The training videos differ from the basic videos in that the basic videos are for instruction only.

The exit program feature (304) generates a warning to save the current picture. The exit program feature (304) can also automatically save a version of the picture. The exit program feature (304) may require a yes or no response in order for the user to exit the program.

Figure 4:
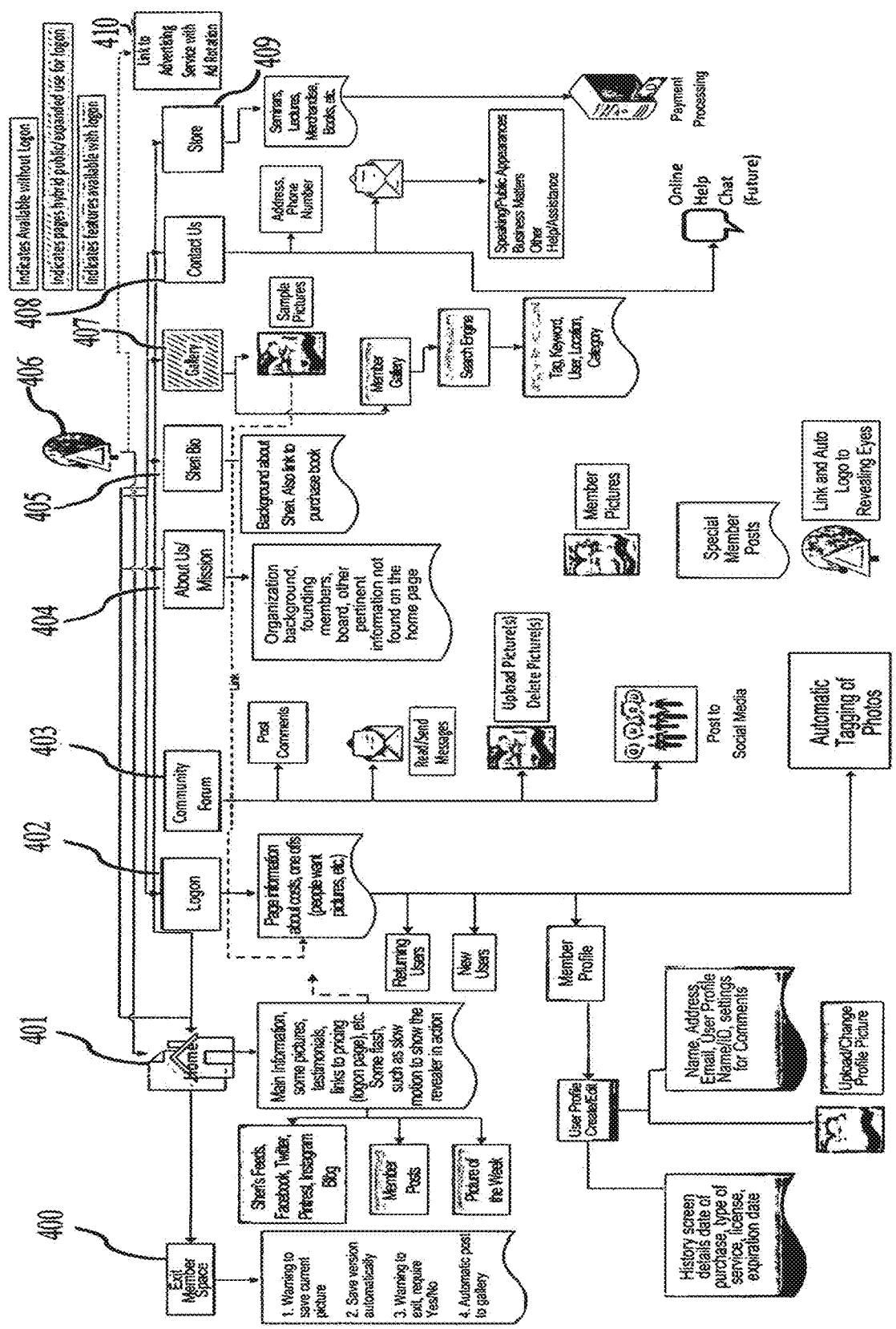
FIG. 4 is a block diagram illustrating a breakdown of feature set by user class as according to an embodiment of the present invention.

Referring now to FIG. 4, there is shown a block diagram illustrating a breakdown of feature set by user class as according to an embodiment of the present invention. The features present in a community for revealing spiritual images are located in a website (406) and include: an exit feature (400), a home page (401), a logon page (402), a community forum (403), an about us and mission statement page (404), a biography page (405), a gallery (407), a contact page (408), a store (409), and a link to an advertising service with ad rotation (410).

There are four types of user classes that can access the various features of the present invention. An administrator is the highest level of user. Administrators manage the website (406) and a special interface added on to the website (406) via a controlled backdoor based on the logon (402) that is set by the system administrator. These logons (402) have access to all areas of the site and allow the administrator to: update content, switch controls for manual or automatic queuing of picture requests, oversee and view all work performed by techs, content managers and have the ability to take the site offline with a systems update page. Administrators also have access to reports and have the ability to deactivate users based on comments made on public pages.

Content Managers are the second type of user. Content Managers will manage the web site and through the use of a Content Management System (CMS) such as WordPress, Drupal, Expression Engine, Content 5, and Plone CMS. Content Managers can view the entire website (406), but have the authority to update only the content on pages and manage advertising (410), and perform similar tasks. Content Managers do not have access to customer data.

Content Managers have the ability to update all content on the web site, including weekly posts by the website founder, administering the ecommerce site for sales of publications, merchandise, etc. Content Managers update all various aspects to keep the website (406) current and also perform the ad rotation (410) for selling of ads on this site. Content Managers can send group email messages to users about special events, new merchandise, classes, or other information as needed.

The third type users are Techs. The Tech privileges are set upon logon (402) by the Administrator. Techs have access to screens exclusively for the use of uploading and downloading pictures, internal messaging system between other Techs and the Administrators solely for revealing pictures on their own computers as part of the community for revealing spiritual images.

The fourth category of users is General Users. Once General Users logon (402), they have the ability to create profiles, upload a profile picture, and upload other pictures to either post for discussion or upload for a Tech to reveal spiritual images for a fee. General Users can also use the community forum (403) to post comments, send messages to other users on the forums, and, through the store (409), purchase books, courses, training, website (406) logon subscriptions, and merchandise. General Users can also access the about us and mission statement page (404), the biography page (405), the gallery (407), the contact page (408), their user profile, and help and training.

Figure 5:
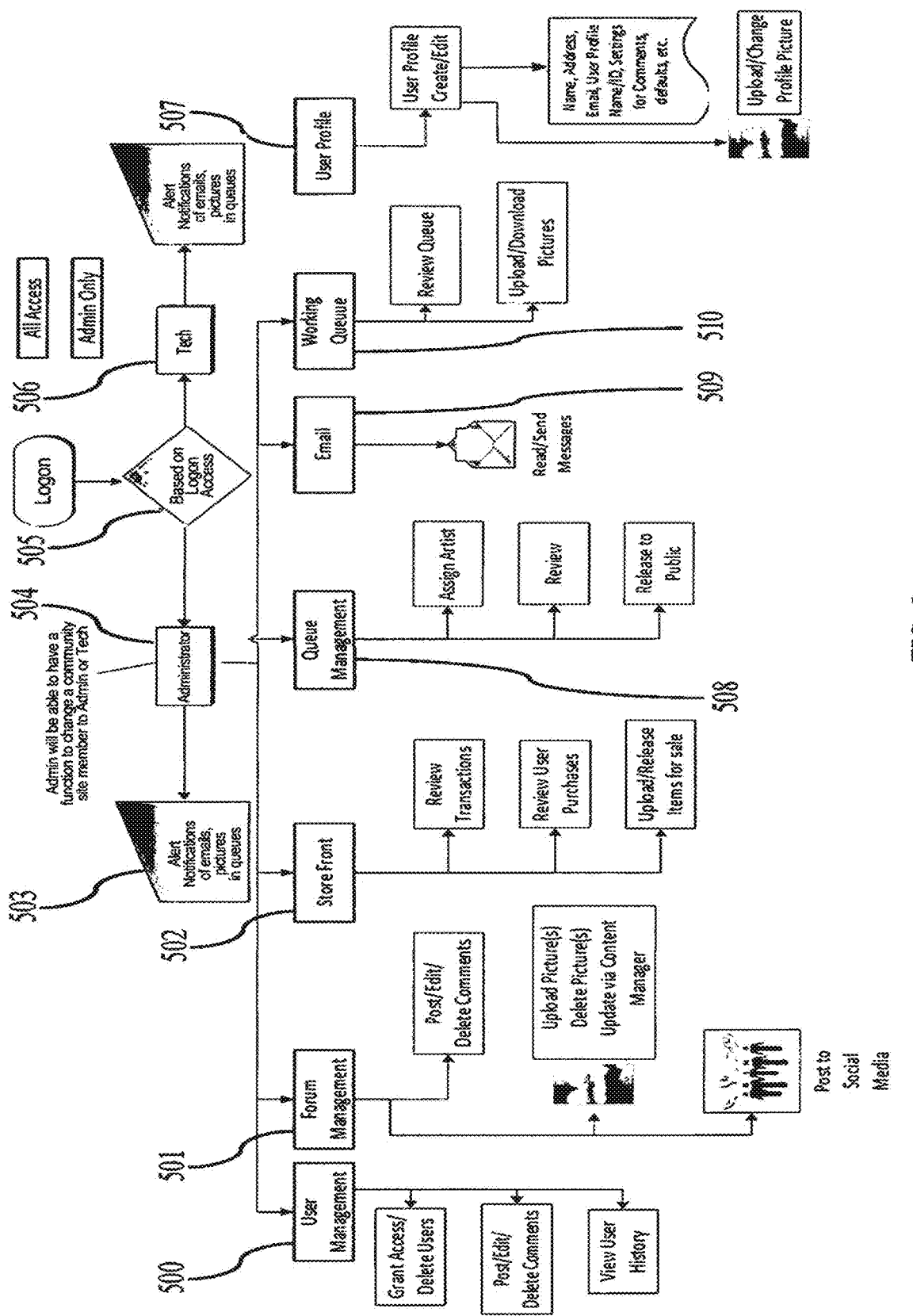
FIG. 5 is a block diagram illustrating user class differentiators as according to an embodiment of the present invention.

Referring now to FIG. 5, there is shown a block diagram illustrating user class differentiators as according to an embodiment of the present invention. Depending on the credentials used at logon (505), a user will be assigned different user privileges. Each user class has access to different features of the community for revealing spiritual images. There are some features that are accessible by Administrators (504) only. The Administrator (504) only features include: user management (500), forum management (501), the store front (502), and queue management (508). In user management (500), Administrators (504) can grant users access or delete a user; post, edit, or delete comments; and view a user's history. In forum management (501), the Administrator (504) can post, edit, or delete comments from the forum; upload pictures, delete pictures, or perform updates via a CMS; and can post to social media. In the store front (502), the Administrator can review transactions, review user purchases, and upload or release items for sale. In queue management (508), Administrators (504) can assign techs to reveal spiritual images in user's pictures, review the status of work, and release items to the public. If a user logs on as a Tech (506), that user can generate alert notifications and view or work on pictures in the working queue (510).

There are features of the community for revealing spiritual images that are accessible by all users. These features include: email (509), the working queue (510), and user profiles (507). Users can read or send messages to other community users using the email feature (509). The working queue (510) allows users to review the progress made on pictures that have already been added to the queue (510), and users can upload or download pictures from the queue (510). The user profile feature (507) allows users to create or edit their user profile. A user's profile contains information about the user including their name, address, email, user profile name, ID, settings for comments, default values, and similar information. Users can also upload or change their profile picture using the user profile feature (507).

Figure 6:
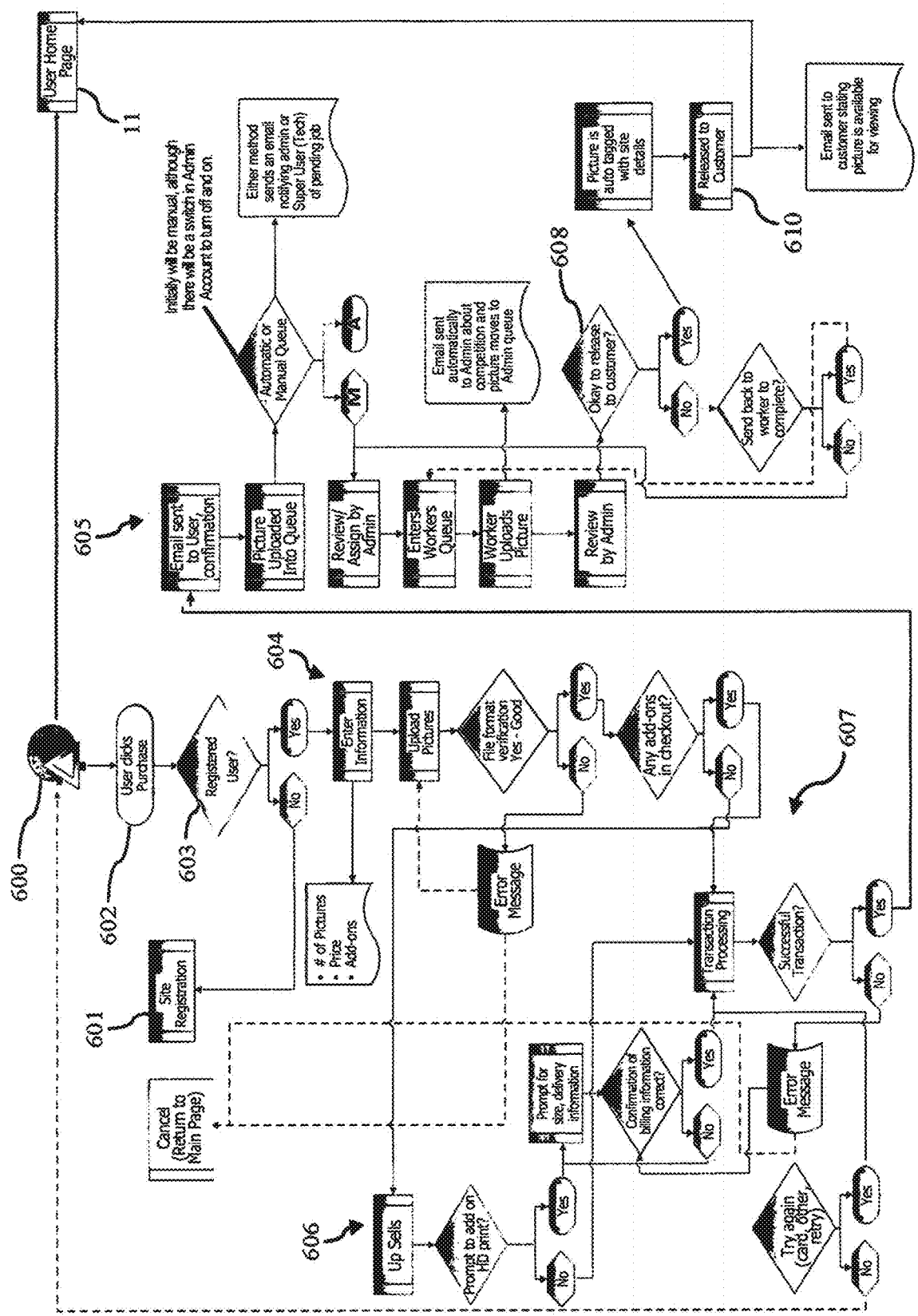
FIG. 6 is a flowchart illustrating a purchase picture flow as according to an embodiment of the present invention.

Referring now to FIG. 6, there is shown a flowchart illustrating a purchase picture flow as according to an embodiment of the present invention. The purchase picture flow is implemented when a user wishes to use the features of the community for revealing spiritual images to reveal spiritual images within a picture. The user can choose to use the community's features to reveal the spiritual images themselves, or can have another community user, such as a Tech, reveal the images for them for a fee. The purchase picture process begins when a user accesses a community for revealing spiritual image's website (600). The user clicks on a purchase icon (602). The user is asked if they are a registered user (603). If the user is not a registered user, they are taken to a site registration process (601). If the user is a registered user, they proceed through a logon and picture upload process (604). The picture upload process verifies that the uploaded file format is acceptable. If the format is not acceptable, an error message is displayed and the user must re-upload their picture. If the format is acceptable, the process asks the user whether they wish to add any items or services to their purchase. If the user does not choose an add-ons, the process attempts to upsell the user by offering such services as High Definition (HD) prints. Once the user has selected their add-ons or chosen whether or not to include HD prints, the user's transaction is processed (607).

After transaction processing (607), the user's the next step in the picture purchase process is entrance into a work queue (605). A confirmation email is sent to the user and their picture is uploaded to the work queue. The user's picture will either be automatically processed, or manually processed by a Tech. Both options send an email notifying an Administrator or a Tech of the pending job. If the user's picture is to be manually processed, it is first reviewed and assigned to a Tech by an Administrator. The picture is then added to that Tech's queue. Once work on the user's picture is completed by the Tech, an Administrator reviews the final product and decides whether to release the picture to the user (608). If the picture is not suitable for release, it is sent back to the Tech for completion. If it is suitable for release, the picture is automatically tagged with site details and released to the customer (610). An email is sent to the customer stating that their picture is ready and available for viewing. The picture is also posted to the user's home page (611) within the community for revealing spiritual images.

Figure 7:
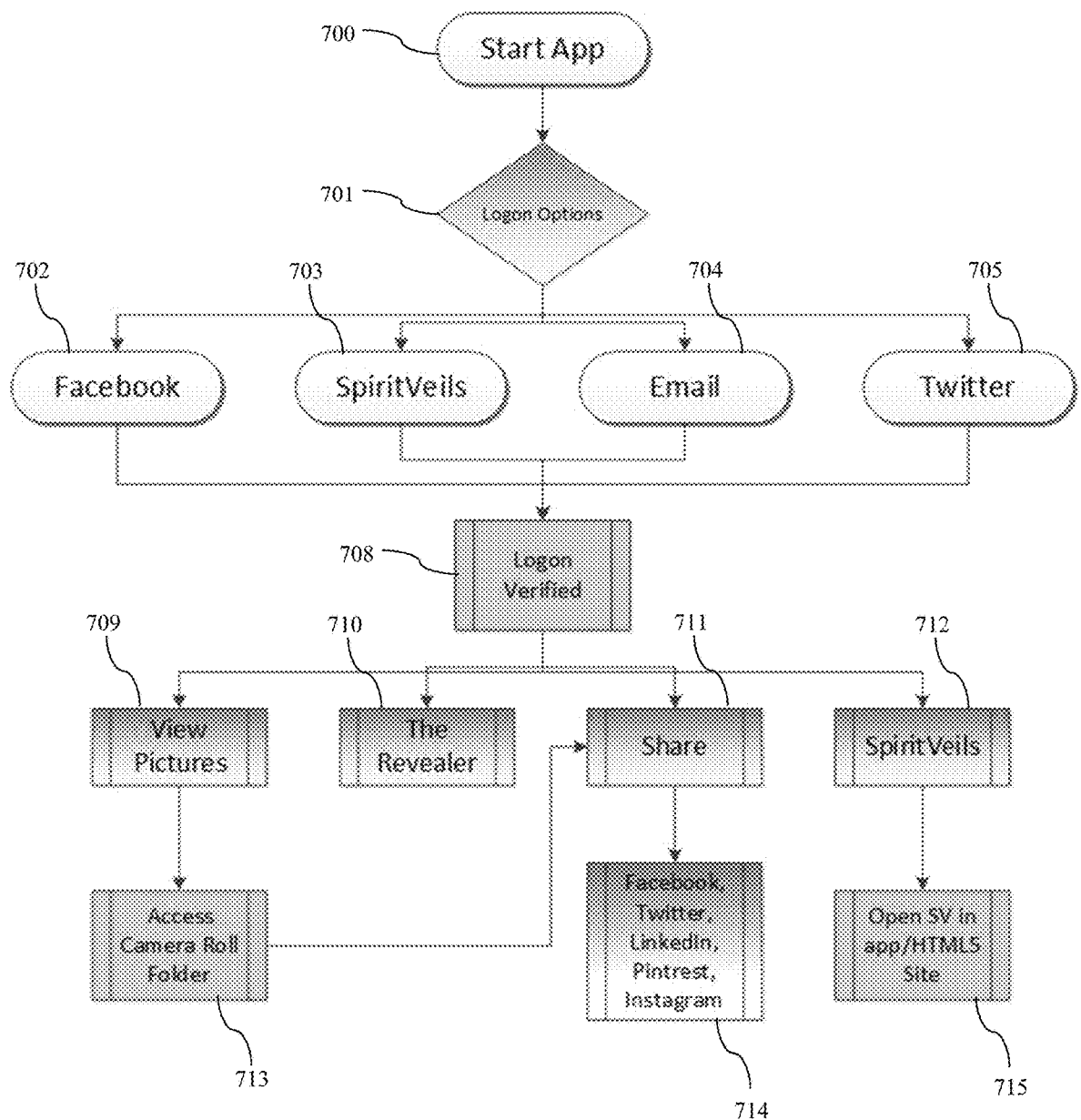
FIG. 7 is a block diagram illustrating a mobile application menu system as according to an embodiment of the present invention.

Referring now to FIG. 7, there is shown a block diagram illustrating a mobile application menu system as according to an embodiment of the present invention. The mobile application can be installed and run on mobile devices including tablets, smartphones, and any other device running a mobile operating system. These mobile operating systems currently include Google's Android™, Apple's iOS™, Nokia's Symbian™, RIM's BlackBerry™, OS, Samsung's Bada™ Microsoft's Windows Phone™, Hewlett-Packard's webOS™, and embedded Linux distributions such as Maemo and MeeGo. Such operating systems can be installed on many different phone models, and typically each device can receive multiple OS software updates over its lifetime. A few other upcoming operating systems are Mozilla's Firefox OS™, Canonical Ltd.'s Ubuntu Phone™, and Tizen™. It is within the scope of the present invention that the presently described mobile application can be adapted to operate on all current and future mobile operating systems.

When the mobile application is started (700), the user can choose different options for logon (701). The user can logon using their Facebook™ (702) information, their SpiritVeils (703) information, their email address (704), or their Twitter™ information. For purposes of this disclosure, the term "SpiritVeils" is meant to represent a website that is part of a community for revealing spiritual images as according to an embodiment of the present invention. "SpiritVeils" and "website" may be used interchangeably herein.

Once the logon has been verified (708), the user may access features of the community for revealing spiritual images. These features include: the ability to view pictures (709), accessing the Revealer feature (710), sharing photographs (711), and accessing the SpiritVeils site (712). For purposes of this disclosure, the term "Revealer" is meant to represent a feature set that allows users to reveal spiritual images within their photographs. The Revealer is within the scope of a community for revealing spiritual images as according to an embodiment of the present invention.

When a user views pictures (709), they can access their camera roll folder (713) and share their pictures (711) to social media sites such as Facebook™, Twitter™, LinkedIn™ Pinterest™, and Instagram™.

When a user accesses the SpiritVeils site (712), they can open SpiritVeils within the application (715) via an HTML5 connection to SpiritVeils. Users can access the SpiritVeils website to create a profile and to send their photographs to the website for further processing. Through the application, users can access SpiritVeils (712) to request that a Tech processes their photograph for a fee.

Figure 8:
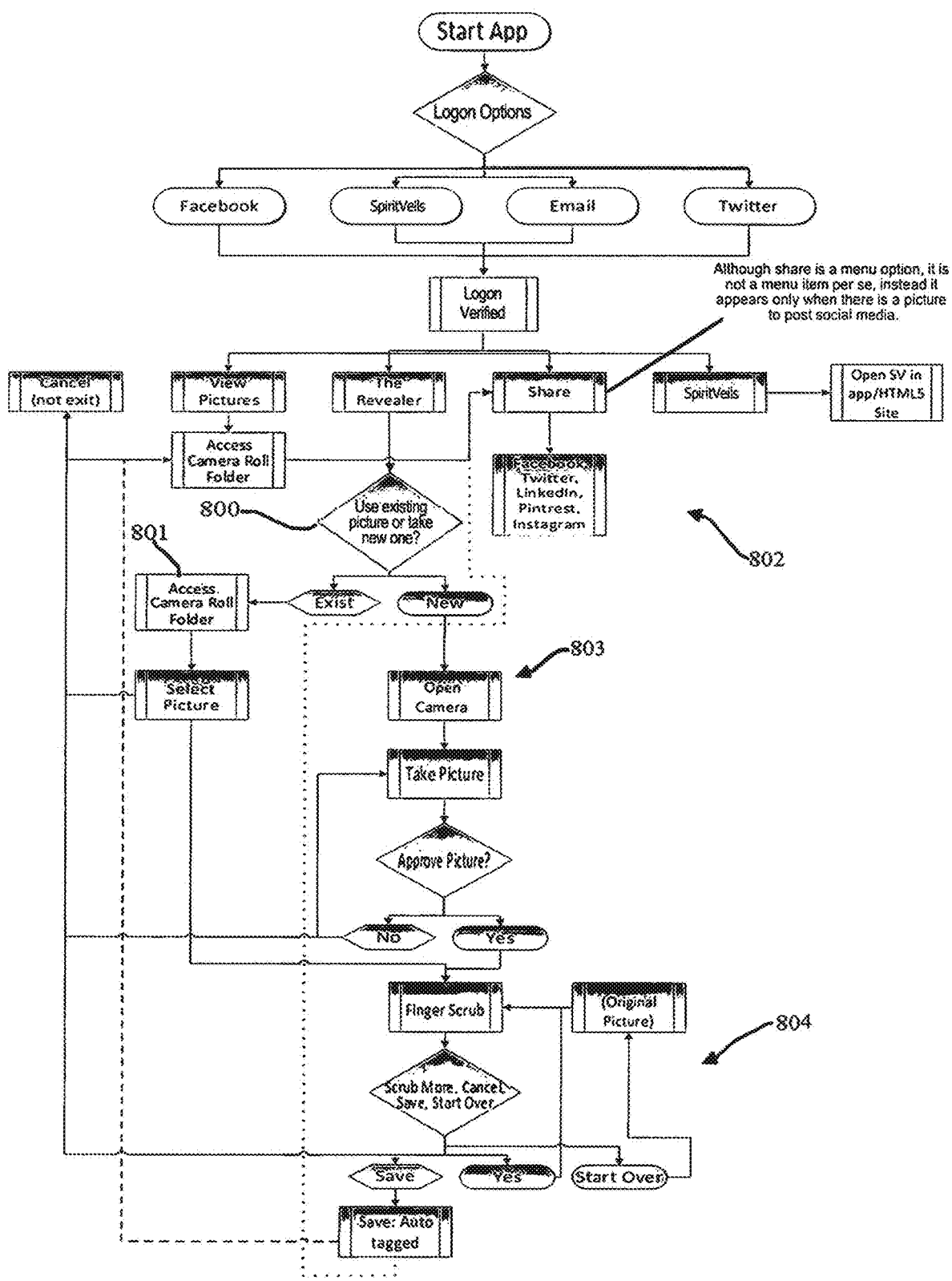
FIG. 8 is a flowchart illustrating a mobile application workflow as according to an embodiment of the present invention.
Figure 9:
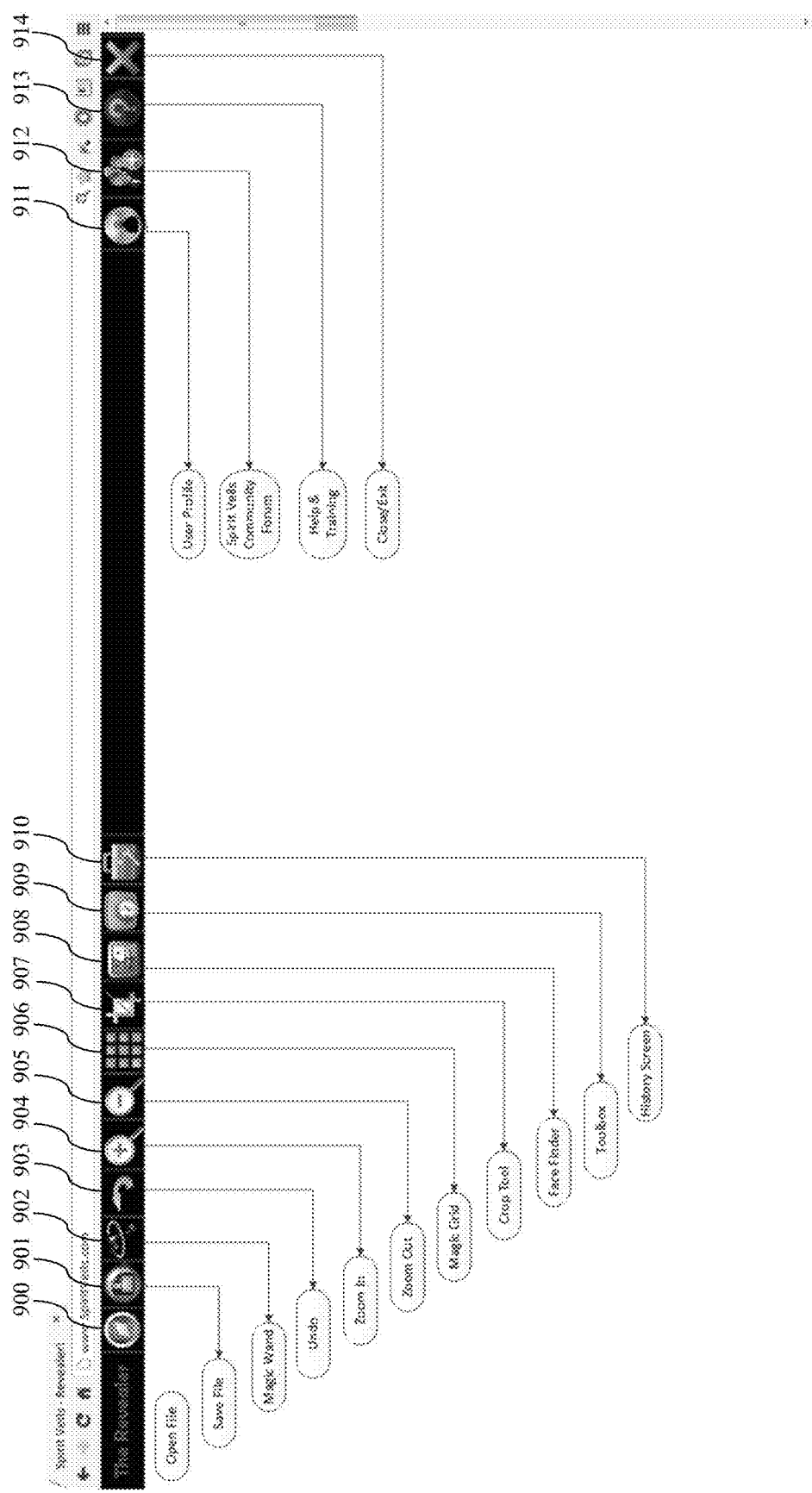
FIG. 9 is a diagram showing an image processing feature layout as according to an embodiment of the present invention.

Referring now to FIG. 8, there is shown a flowchart illustrating a mobile application workflow as according to an embodiment of the present invention. A user accesses a mobile application (802) as aforementioned above in FIG. 7 in order to reveal a spiritual image within a picture. The mobile application asks the user whether they would like to use an existing picture, or take a new one (800). If the user decides to use an existing picture, they access their camera roll folder (801) where their existing pictures are stored. The user selects a picture from the camera roll then proceeds to an image processing phase (804).

If the user chose to take a new picture, they proceed through an image capture phase (803). The camera feature on their mobile device is opened so that the user can take a new picture. Once they take a picture, the application asks the user whether they approve of the picture. If they do not approve of the picture, they can access their camera roll to select a picture or use the camera feature to take another picture. When the user approves of a picture they have taken, they proceed to the image processing phase (804).

The image processing phase (804) allows the user to scrub their picture to reveal spiritual images. Scrubbing, as embodied in the present invention, is a photo-processing step that involves dodging, burning, saturating, or desaturating an area of a picture selected by user input. The exact photo-processing technique to be applied: dodge, burn, saturate or desaturate, can be selected by the user or automatically selected by the application after an analysis of the picture area selected by the user. In one embodiment of the present invention, a user takes a picture of clouds. The user selects automatic scrubbing thereby requiring the application to decide which photographic technique to apply. The user then swipes their finger over a section of clouds. The application generates an image histogram and compares the swiped area to the histogram values. The application determines if the swiped areas exceed established luminosity tolerances for lighter colors indicating the swiped area is overexposed. The application then applies a burn function to reduce luminosity. The user may be instructed to first look for a pair of eyes in an image, determine the pupil inside each iris, make sure each eye matches the other, and slowly identify the face around the eyes, by relying on the existing contrast and perhaps by referencing where the dark places are within a standard face. The user may reference an "eye grid" that may include an eye in each nostril, eyes within lips, and/or two faces with a shared center eye.

After scrubbing, the user is presented with the option to scrub more, cancel, save his work, or start over. If he chooses to save his work, the picture is automatically tagged with information about the community for revealing spiritual images and he can share his picture. If a user chooses to cancel, he quits the picture-processing phase (804), but does not exit the application. If the user chooses to scrub more, he can continue scrubbing the picture. If the user chooses to start over, the picture is restored to its original values and the user can restart the scrubbing process.

Referring now to FIGS. 9-13, that will be discussed together, there are shown views of an image processing feature as according to an embodiment of the present invention. The image processing feature is used to reveal spiritual images within pictures. The feature contains sub-features that perform specific tasks that allow users to reveal spiritual images. These sub-features are accessed by clicking on icons within the image processing feature. It should be noted that the shown icons are merely exemplary in appearance. Their designations in this disclosure are representative of the functions that are implemented when the icons are activated. The icons include: an open file icon (900), a save file icon (901), a magic wand icon (902), an undo icon (903), a zoom in icon (904), a zoom out icon (905), a magic grid icon (906), a crop tool icon (907), a face finder icon (908), a toolbox icon (909), a history screen icon (910), a user profile icon (911), a community forum icon (912), a help and training icon (913), and a close/exit icon (914). Clicking on individual icons implements their associated functions, descriptions of which have been aforementioned in this disclosure.

Figure 10:
FIG. 10 is a diagram showing an image processing feature with a loaded image as according to an embodiment of the present invention.

FIG. 10 shows an image processing feature with a photograph (915) opened in a work area. FIG. 10 also shows a tool box screen (916) opened to the right of the picture. The tool box screen (916) allows users to change the settings of the tools they are currently working with.

Figure 11:
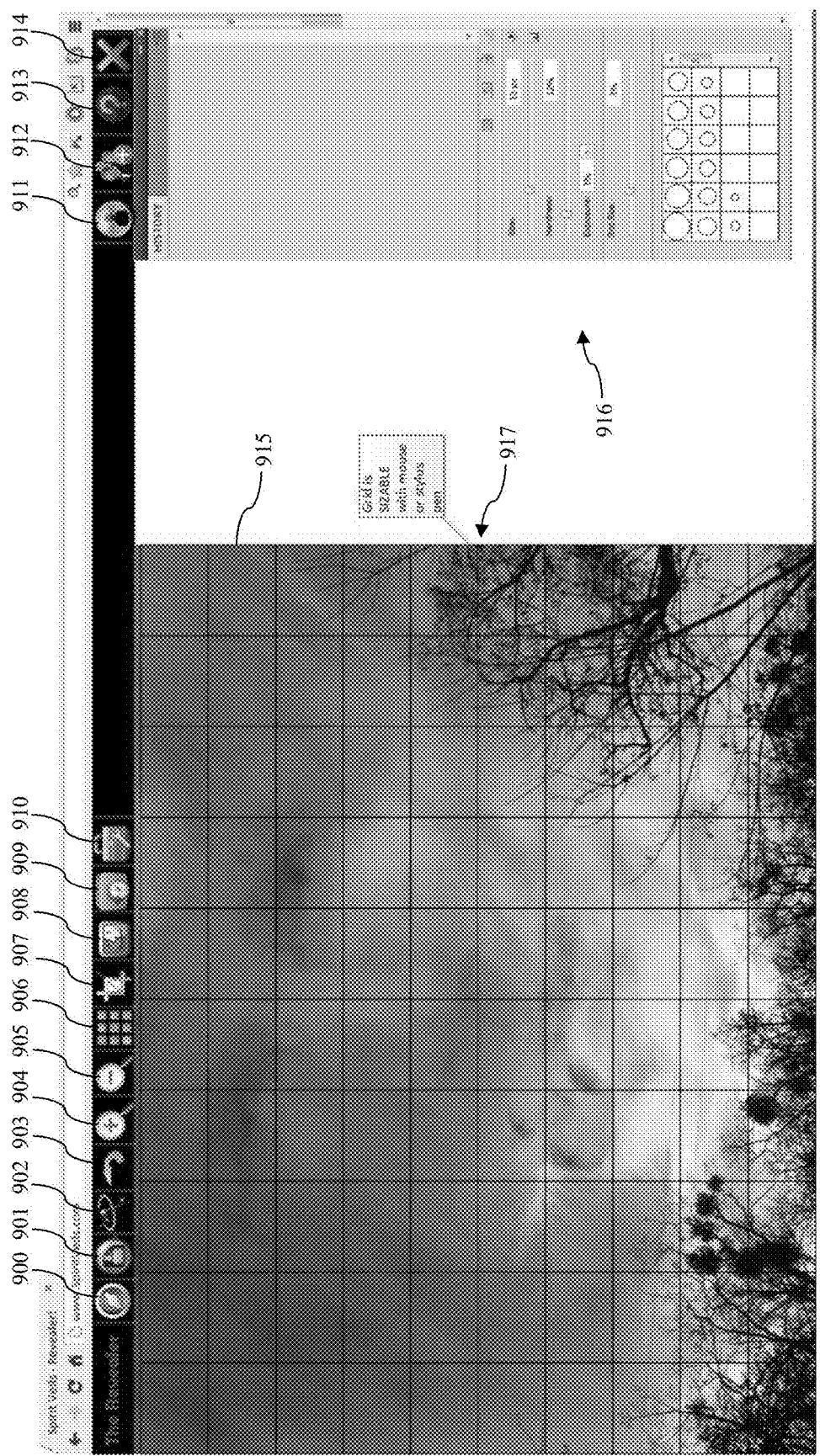
FIG. 11 is a diagram showing an image processing feature with a loaded image and a grid overlaid on the image as according to an embodiment of the present invention.

FIG. 11 shows an image processing feature with a magic grid (917) overlaid on the photograph (915). The magic grid (917) assists users in finding hidden spiritual images by creating guidelines that allow the user to focus their attention on specific areas of the photograph (915). The size of the magic grid (917) can be adjusted with a mouse or stylus pen.

Figure 12:
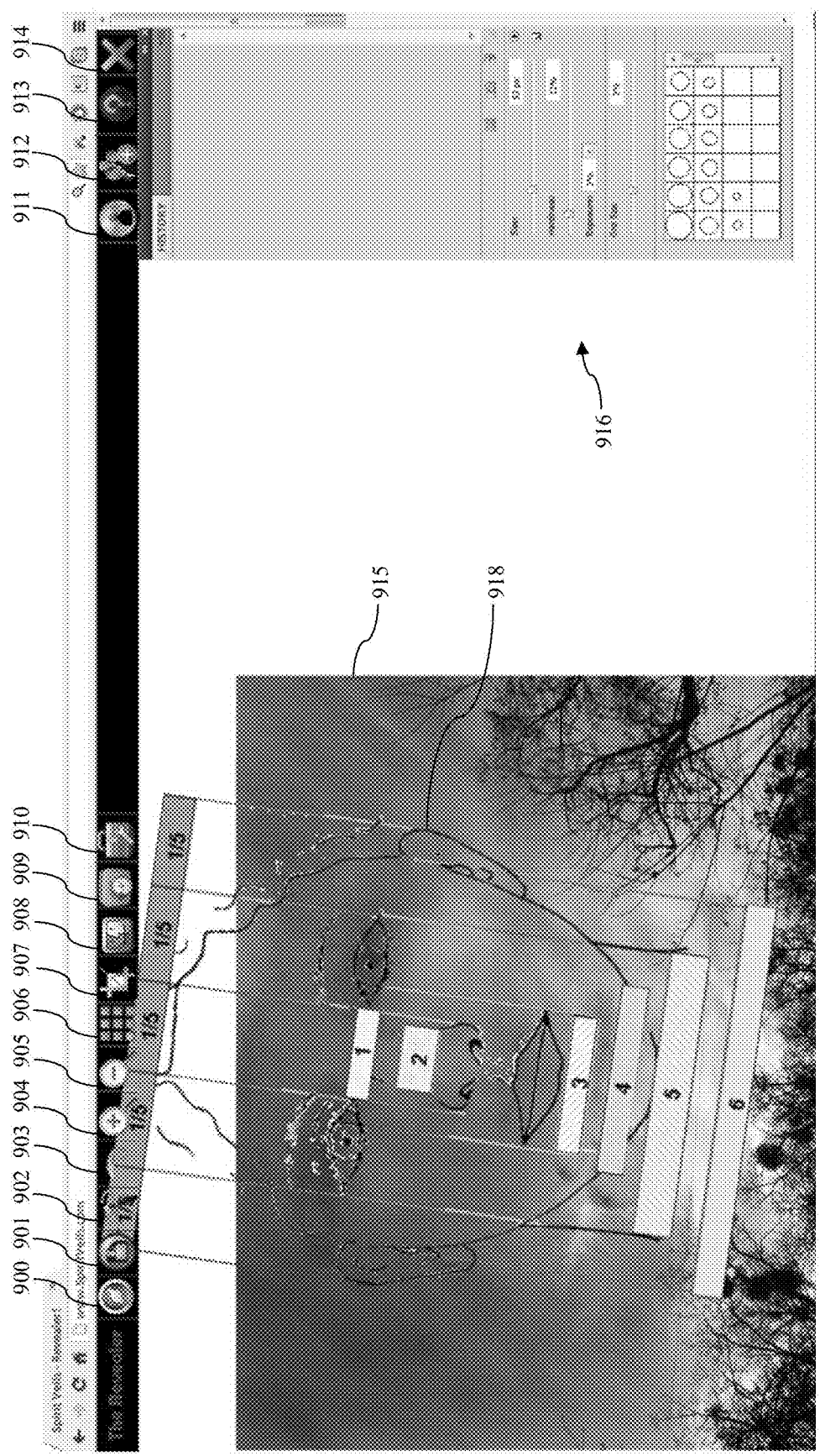
FIG. 12 is a diagram showing an image processing feature with a loaded image and a face finder tool overlaid on the image as according to an embodiment of the present invention.

FIG. 12 shows an image processing feature with a face finder grid (918) overlaid on the photograph (915). The face finder grid (918) allows users to locate faces or facial features within their photograph (915). The face finder grid (918) is sizeable and rotatable so that hidden faces or facial features within the photograph can be easily identified. When a user discovers a head within their photograph, they can anchor the top of the head of the face finder grid (918) on the discovered head, then rotate and resize the face finder grid (918) to locate other facial features or the remainder of the face. The perspective of the face finder grid (918) can be adjusted so that the grid (918) properly overlays a discovered face. Adjusting perspective of the face finder grid (918) involves rotating or resizing the grid along x, y, or z axis so that it overlays a discovered face within the photograph.

Figure 13:
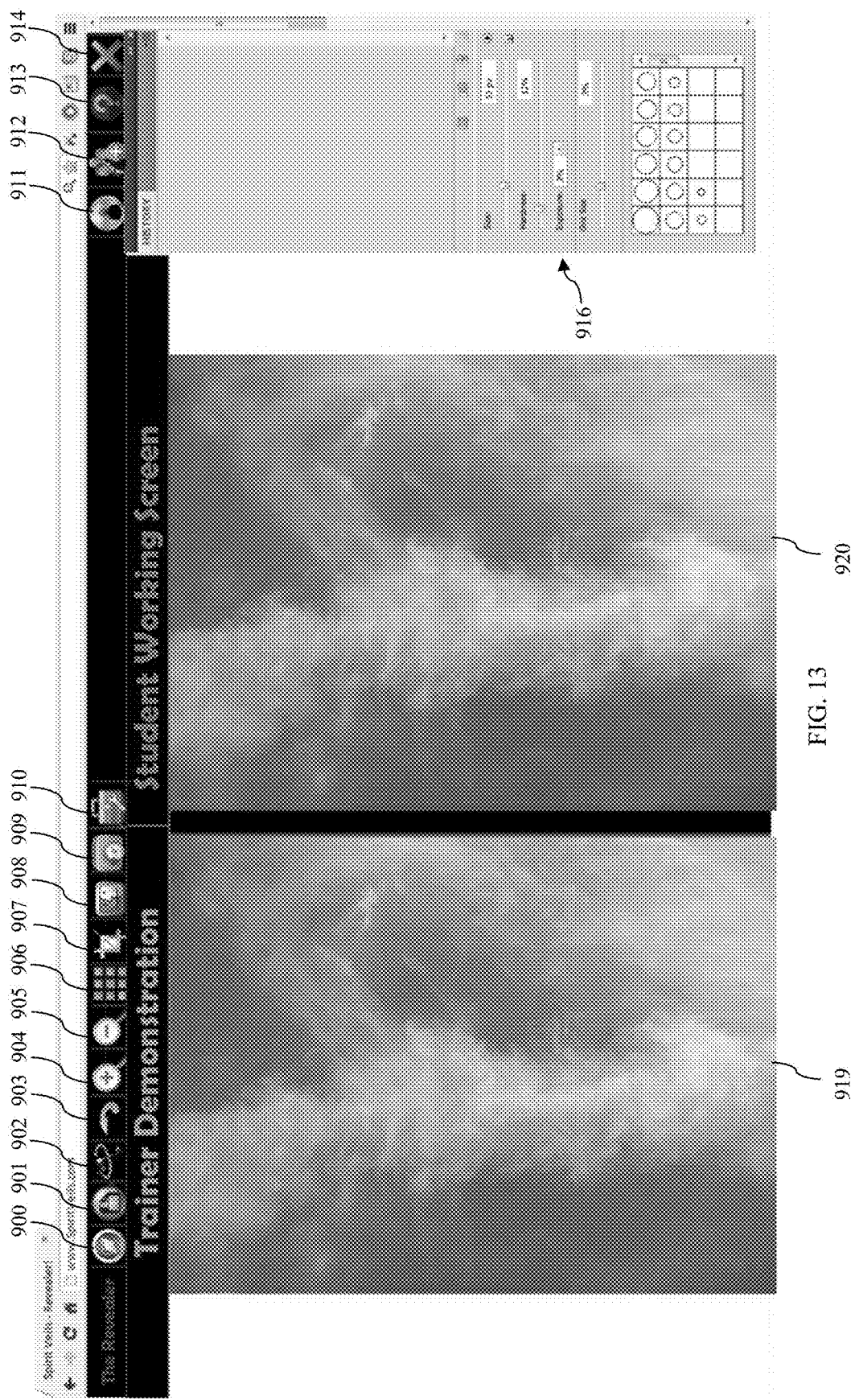
FIG. 13 is a diagram showing a training screen as according to an embodiment of the present invention.

FIG. 13 shows a trainer demonstration (919) and a student working screen (920) opened in the image processing feature. The trainer demonstration (919) can be an interactive session with a Tech user. Embodiments of the present invention allow students and trainers to work together so that the students can learn to use the invention's features to reveal spiritual images on their own.

Figure 14:
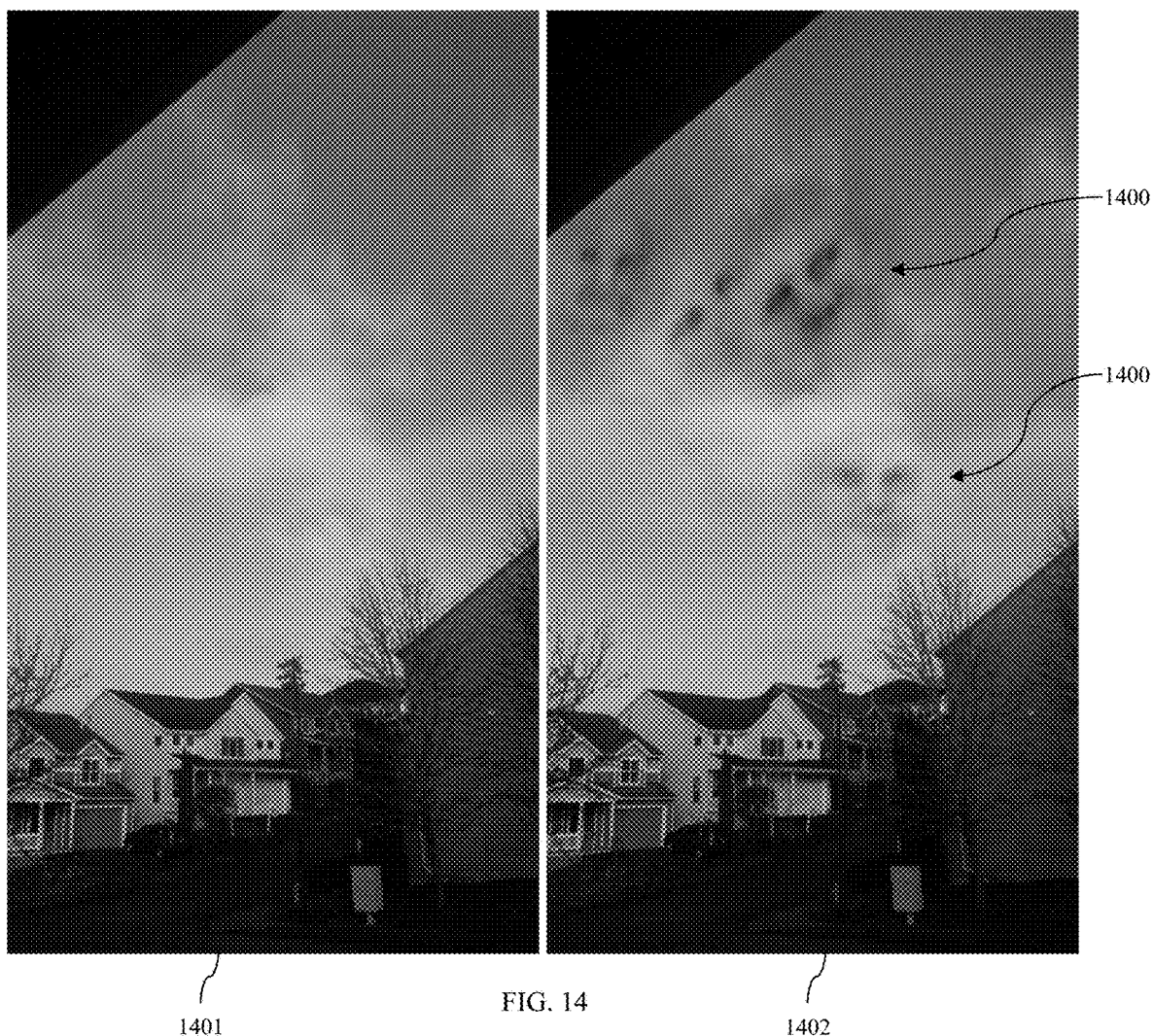
FIG. 14 is a diagram showing a picture before and after processing as according to an embodiment of the present invention.

Referring now to FIG. 14, there is shown a diagram showing a picture before (1402) and after (1402) processing as according to an embodiment of the present invention. The before image (1401) shows the picture before it has undergone the processes of the present invention. The after picture (1402) shows hidden spiritual images that were revealed through the processes provided by the present invention. The after picture (1402) shows several faces and parts of faces (1400) that were revealed by the present invention.

Figure 15:
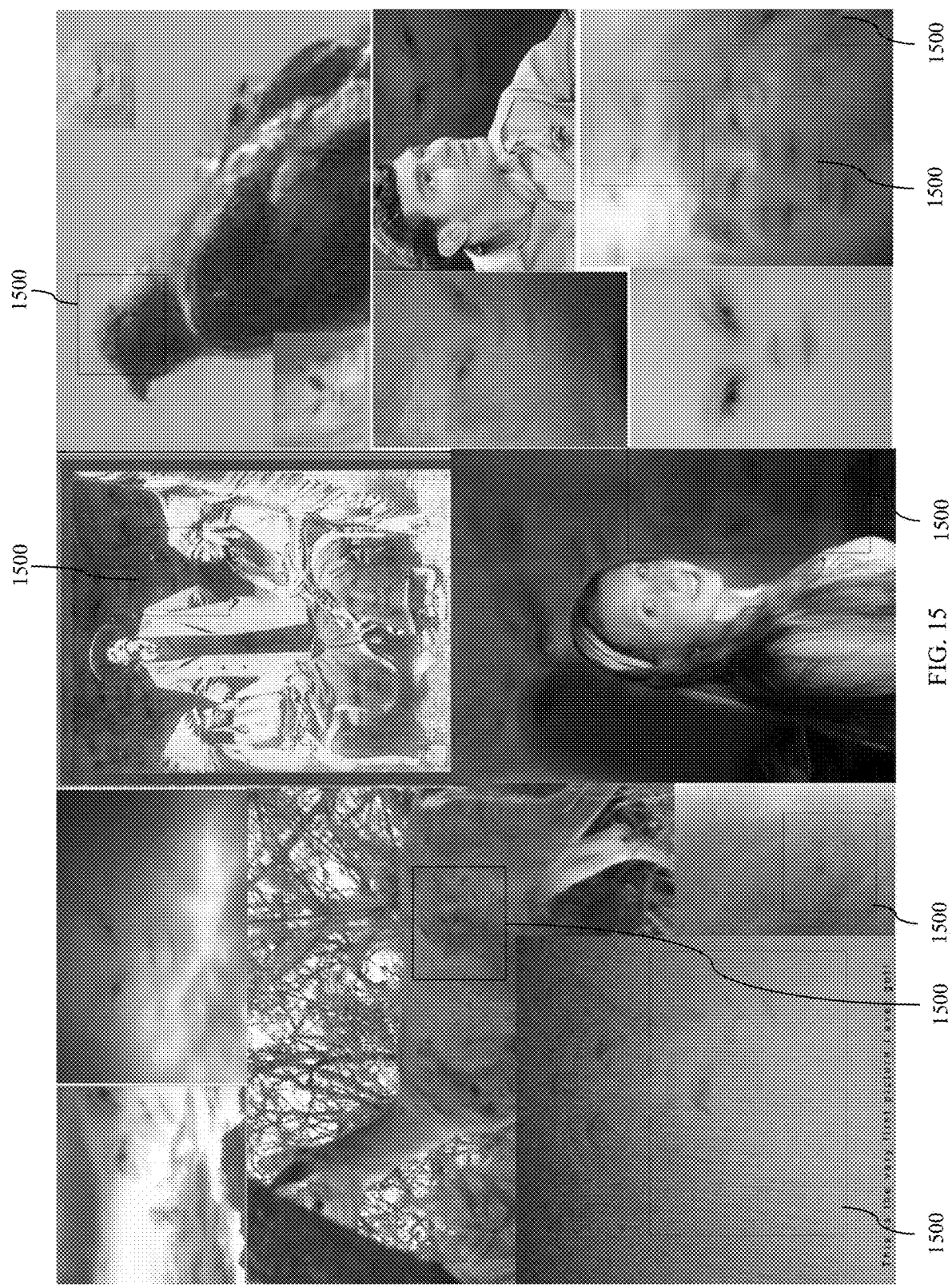
FIG. 15 is a diagram showing pictures with spiritual images revealed after processing as according to an embodiment of the present invention.
Figure 16:
FIG. 16 is an exemplary revealed face with additional faces revealed, in accordance with some embodiments of the present disclosure.
Figure 17:
FIG. 17 is an exemplary image with revealed figures, in accordance with some embodiments of the present disclosure.

Referring now to FIG. 15, there is shown a diagram showing pictures with spiritual images revealed after processing as according to an embodiment of the present invention. The pictures have been processed using the features and functions set forth in this description. Some of the individual pictures within FIG. 15 have areas that have been highlighted (1500) to call attention to the revealed spiritual images. As can be seen in FIG. 15, the revealed spiritual can be found in pictures that were taken during different historical periods.

As set forth in this description and the attached images, an improved community for revealing spiritual images has been developed that allows users to discover and reveal spiritual images that were previously hidden in their photographs. The various embodiments of the improved community for revealing spiritual images described herein are implemented through the use of a computer that executes software-based instructions.

It should be noted that embodiments of the above-mentioned system are implemented by instructions executed on a computer. More specifically, software running on a network server, such as an Internet-enabled server, executes commands that enable the system to operate in the manner described above. This software can be viewed as a series of machine-implemented steps that provide the functionality of the system. The machine-implemented steps transform user input and commands into photograph-altering steps that reveal the hidden spiritual images.

Of course, persons of ordinary skill in the art will recognize that the configuration of the system illustrated in the embodiments may vary. Additionally, although this patent discloses embodiments including, among other components, software or firmware executed on hardware, it should be noted that such embodiments are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such embodiments.

At least some of the above described embodiments are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to email or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of this disclosure are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

The preceding exemplary embodiments are not intended to be limiting, but are merely illustrative for the possible uses for community for revealing spiritual images.

Although certain example apparatus and articles of manufacture have been described herein, the scope of coverage of this patent is not limited thereto. On the contrary, this patent covers all apparatus and articles of manufacture fairly falling within the scope of the invention either literally or under the doctrine of equivalents.

With respect to the above description then, it is to be realized that the optimum dimensional relationships for the parts for community for revealing spiritual images, to include variations in size, materials, shape, form, function and the manner of operation, and use, are deemed readily apparent and obvious to one skilled in the art, and all equivalent relationships to those illustrated in the images and described in the specification are intended to be encompassed by the community for revealing spiritual images.

Directional terms such as "front", "back", "in", "out", "downward", "upper", "lower", "top", "bottom", "lateral", "vertical" and the like have been used in the description. These terms are applicable to the embodiments shown and described in conjunction with the images. These terms are merely used for the purpose of description in connection with the images and do not necessarily apply to the positions in which the community for revealing spiritual images may be used.

Therefore, the foregoing is considered as illustrative only of the principles for community for revealing spiritual images. Further, since numerous modifications and changes will readily occur to those skilled in the art, it is not desired to limit the community for revealing spiritual images to the exact construction and operation shown and described, and accordingly, all suitable modifications and equivalents may be resorted to, falling within the scope for community for revealing spiritual images. While the above description describes various embodiments of the present invention, it will be clear that the present invention may be otherwise easily adapted to fit any configuration where a community for revealing spiritual images is desired or required.

As various changes could be made in the above constructions without departing from the scope of the invention, it is intended that all matter contained in the above description or shown in the accompanying images shall be interpreted as illustrative and not in a limiting sense.

I claim:

1. A method for presenting latent figures in digital imagery, the method comprising the steps of:
    providing a user interface on a display, wherein the user interface includes one or more image revealing tools;
    displaying a facial fractal pattern in the user interface, the facial fractal pattern including a nose with an eye within a nostril of the nose;
    comparing the facial fractal pattern to the background of a digital image in the user interface;
    modifying the digital image, using the one or more revealing tools, to reveal a first eye with a first iris and pupil based on identifying the first eye with the first iris and pupil within the background of the digital image;
    modifying the digital image, using the one or more revealing tools, to reveal a first nose based on identifying the first nose with a nostril located below the first eye within the background of the digital image; and modifying the digital image, using the one or more revealing tools, to reveal a second eye based on identifying the second eye within the nostril of the first nose within the background of the digital image.

2. The method of claim 1, further comprising modifying the digital image, using the one or more revealing tools, to reveal a second nose based on identifying the second nose below the second eye within the background of the digital image.

3. The method of claim 1, further comprising modifying the digital image, using the one or more revealing tools, to reveal a third eye based on identifying the third eye to one of the left and right of the second eye within the background of the digital image.

4. The method of claim 1, further comprising modifying the digital image, using the one or more revealing tools, to reveal a mouth based on identifying the mouth below the second eye within the background of the digital image.

5. The method of claim 1, further comprising:
identifying a second iris and pupil within a third eye to one of the left and right of the first eye;
comparing the identified second iris and pupil of the third eye against the first iris and pupil of the first eye to determine if the identified first and third eyes match based on the first and second iris and pupil; and
modifying the digital image, using the one or more revealing tools, to reveal the second iris and pupil within the third eye within the background of the digital image if the first and third eyes are determined to match.

6. The method of claim 1, wherein the method is performed within a mobile application.

7. The method of claim 1, wherein the method is performed within an online application.

8. A method for discovering latent figures in images, the method comprising:
providing a user interface on a display, wherein the user interface includes one or more image revealing tools;
displaying a facial fractal pattern in the user interface, the facial fractal pattern including a mouth with an eye within the lips of the mouth;
comparing the facial fractal pattern to the background of an image in the user interface;
modifying the image, using the one or more revealing tools, to reveal a first eye with a first iris and pupil based on identifying the first eye with the first iris and pupil within the background of the image;
modifying the image, using the one or more revealing tools, to reveal a first mouth based on identifying the first mouth with lips located below the first eye within the background of the image; and
modifying the image, using the one or more revealing tools, to reveal a second eye based on identifying the second eye within the lips of the first mouth within the background of the image.

9. The method of claim 8, further comprising modifying the image, using the one or more revealing tools, to show a second mouth based on identifying the second mouth below the second eye within the background of the image.

10. The method of claim 8, further comprising modifying the image, using the one or more revealing tools, to reveal a third eye based on identifying the third eye to one of the left and right of the second eye within the background of the image.

11. The method of claim 8, further comprising modifying the image, using the one or more revealing tools, to reveal a nose based on identifying the nose below the second eye within the background of the image.

12. The method of claim 8, further comprising:
identifying a third eye with a second iris and pupil to one of the left and right of the first eye;
comparing the identified second iris and pupil of the third eye against the first iris and pupil of the first eye to determine if the identified first and third eyes match based on the first and second iris and pupil; and
modifying the digital image, using the one or more revealing tools, to reveal the second iris and pupil within the third eye within the background of the digital image if the first and third eyes are determined to match.

13. The method of claim 8, wherein the method is performed within a mobile application.

14. The method of claim 8, wherein the method is performed within an online application.

15. A method of revealing a latent facial feature within a photograph, the method comprising:
providing a user interface on a display;
displaying a facial fractal pattern in the user interface along with the photograph, the facial fractal pattern including at least one of:
a first eye with each of a second eye, nose, and mouth within the first eye;
a pair of eyes with a third eye to the right or left of one of the pair of eyes;
a mouth with an eye within the lips of the mouth;
a nose with an eye within a nostril of the nose; and
a first eye, eyebrow, and nose with a second eye under the eyebrow near the bridge of the nose;
providing one or more photographic revealing tools on the user interface;
comparing the facial fractal pattern in the user interface to the background of the photograph in the user interface; and
modifying the photograph, using the one or more revealing tools, to reveal facial features within the background of the photograph based on identifying the facial features latent within the background of the photograph revealed by the comparing step.

16. The method of claim 15, further comprising displaying at least one additional facial fractal pattern for reference.

17. The method of claim 15, wherein the one or more revealing tools comprises a darkening tool to darken the identified latent facial features within the background of the photograph.

18. The method of claim 15, wherein the method is performed within one of a mobile application and an online application.

19. The method of claim 15, wherein the latent facial features belong to at least one of a human face, a spirit face, and an animal face.

* * * * *